United States Patent
Appel et al.

(10) Patent No.: US 11,244,161 B2
(45) Date of Patent: Feb. 8, 2022

(54) MANAGING TREE RISK

(71) Applicant: INTERNATIONAL BUSINESS MACHINES CORPORATION, Armonk, NY (US)

(72) Inventors: Ana Paula Appel, São Paulo (BR); Renato Luiz De Freitas Cunha, São Paulo (BR); Ariane Hernandes Amadeu, São Paulo (BR); Guilherme Custodio de Souza, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 16/524,402

(22) Filed: Jul. 29, 2019

(65) Prior Publication Data

US 2021/0034866 A1    Feb. 4, 2021

(51) Int. Cl.
*G06K 9/00* (2006.01)
*G08B 27/00* (2006.01)

(52) U.S. Cl.
CPC ..... *G06K 9/00657* (2013.01); *G06K 9/00671* (2013.01); *G08B 27/001* (2013.01)

(58) Field of Classification Search
None
See application file for complete search history.

(56) References Cited

U.S. PATENT DOCUMENTS

| | | | | |
|---|---|---|---|---|
| 7,764,810 B2* | 7/2010 | Rahmes | ................... | G06T 17/05 382/109 |
| 8,073,192 B2* | 12/2011 | Huang | ................... | G01N 33/46 382/100 |
| 8,194,916 B2* | 6/2012 | Ma | ................... | G06K 9/00657 382/100 |
| 8,381,501 B2 | 2/2013 | Koselka | | |
| 8,577,083 B2* | 11/2013 | Kirk | ................... | G06T 7/73 382/103 |
| 9,877,428 B2 | 1/2018 | Moore | | |
| 10,755,357 B1* | 8/2020 | Davis | ................... | G06K 9/00637 |

(Continued)

FOREIGN PATENT DOCUMENTS

| | | | |
|---|---|---|---|
| CN | 101777171 A | 7/2010 | |
| CN | 103093111 B | 11/2016 | |

(Continued)

OTHER PUBLICATIONS http://www.treesaregood.org/treeowner/treehazards, "Managing Hazards and Risks", printed May 20, 2019, pp. 1-4.

(Continued)

*Primary Examiner* — Tahmina N Ansari
(74) *Attorney, Agent, or Firm* — John Noh

(57) ABSTRACT

A method, a computer program product, and a computer system manage tree risk. The method includes receiving images corresponding to a geographic area. The method includes determining whether a first tree captured in at least one of the images has a condition exhibiting a tree risk that poses a hazard above an acceptable threshold. As a result of the first tree having the condition above the acceptable threshold, the method includes generating a notification identifying the first tree and a location of the first tree. The method includes transmitting the notification to a team equipped to remediate the condition of the first tree.

22 Claims, 6 Drawing Sheets

(56) References Cited

U.S. PATENT DOCUMENTS

| | | | | |
|---|---|---|---|---|
| 2012/0169498 | A1* | 7/2012 | Leppanen | G06K 9/00657 |
| | | | | 340/540 |
| 2014/0132409 | A1 | 5/2014 | Billman | |
| 2014/0257862 | A1* | 9/2014 | Billman | G06Q 50/163 |
| | | | | 705/4 |
| 2015/0134384 | A1* | 5/2015 | Heinonen | G06Q 10/0631 |
| | | | | 705/7.12 |
| 2015/0317740 | A1 | 11/2015 | Emison | |
| 2017/0277953 | A1* | 9/2017 | Stanley | G01B 11/28 |
| 2018/0092304 | A1 | 4/2018 | Moore | |
| 2018/0220589 | A1 | 8/2018 | Burden | |
| 2019/0325576 | A1* | 10/2019 | Brown | G06T 7/0012 |
| 2020/0051242 | A1* | 2/2020 | Stanley | G01S 17/89 |
| 2021/0034866 | A1* | 2/2021 | Appel | G06K 9/00657 |

FOREIGN PATENT DOCUMENTS

| | | |
|---|---|---|
| CN | 108520363 A | 9/2018 |
| JP | 3056270 U | 2/1999 |
| JP | 2010239870 A | 10/2010 |
| WO | 2018191442 A1 | 10/2018 |

OTHER PUBLICATIONS

International Society of Arboriculture, "Recognizing Tree Risk", 2011, www.isa-abror.com, www.treesaregood.org, pp. 1-2.

Mell et al., "The NIST Definition of Cloud Computing", National Institute of Standards and Technology, Special Publication 800-145, Sep. 2011, pp. 1-7.

* cited by examiner

MANAGING TREE RISK

BACKGROUND

The exemplary embodiments relate generally to tree risk, and more particularly to managing strategies to ensure trees are able to provide benefits while minimizing risks.

Vegetation may provide numerous benefits to those living and/or working in an urban environment. For example, trees clean the air in the urban environment from fumes created by automobiles, factories, etc. Trees may promote improved health from lowering heart rates, lowering blood pressure, relaxing brain wave patterns, etc. Trees may also provide natural beauty in the urban environment that has been linked to lower crime rates. As trees increase with size and age, an amount of the benefits provided by the trees may increase. However, older and larger trees may also be more likely to drop branches or cause root conflicts on sites that the trees inhabit. Environmental conditions may also increase the hazards associated with trees such as when strong winds blow or precipitation events occur. The tree risk posed by the hazards associated with trees may cause damage to property or people. Thus, tree owners for trees that are personally owned or governmentally owned must manage the trees to reduce the tree risk while still availing to the benefits.

SUMMARY

The exemplary embodiments disclose a method, a computer program product, and a computer system for managing tree risk. The method comprises receiving images corresponding to a geographic area. The method comprises determining whether a first tree captured in at least one of the images has a condition exhibiting a tree risk that poses a hazard above an acceptable threshold. As a result of the first tree having the condition above the acceptable threshold, the method comprises generating a notification identifying the first tree and a location of the first tree. The method comprises transmitting the notification to a team equipped to remediate the condition of the first tree.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
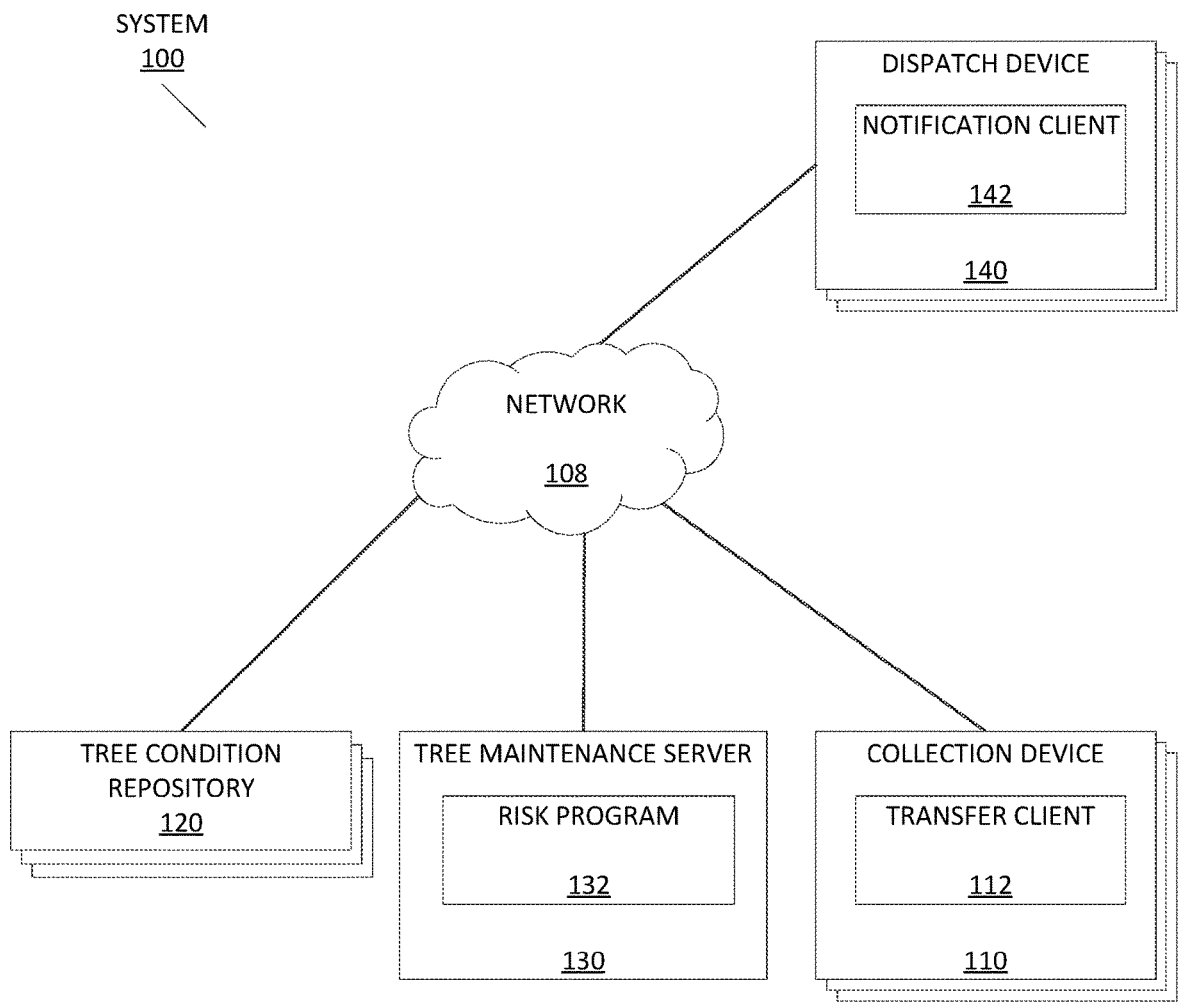
FIG. 1 depicts an exemplary schematic diagram of a tree management system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for managing tree risk by preventing hazards that may be posed by trees. As will be described in greater detail below, the exemplary embodiments are configured to analyze images of geographic areas that include trees. In processing the images and determining the conditions of the trees, the exemplary embodiments may determine a probability of a hazard being posed by the various trees in the geographic area where the probability may be impacted by environmental conditions. As a result of the probability of the hazard being greater than an acceptable threshold for a selected one of the trees, the exemplary embodiments may determine a reason for the tree posing the hazard. The exemplary embodiments may further indicate the reason and/or a solution to a dispatch team that confirms and remediates the situation involving the selected tree. In this manner, the exemplary embodiments may proactively detect and handle tree risk. Key benefits of the exemplary embodiments may include proactively preventing damage that may be caused by trees in an urban environment while retaining benefits that the trees may provide. Detailed implementation of the exemplary embodiments follows.

Conventional manners to address hazards posed by trees generally utilize a reactive approach. For example, a first conventional approach may have received an indication of a tree that is likely to fall. The first conventional approach uses cuttings to support the tree to prevent it from falling. In another example, a second conventional approach may have received an indication of a tree that has fallen. The second conventional approach provides a tool for attaching a rope to pull a logged tree. Therefore, these conventional approaches rely on having already received an indication of a tree that is likely to fall or has already fallen and reactively taking appropriate action.

Other conventional approaches to address hazards that may occur on property may relate to mitigating risks around a home. For example, a third conventional approach may identify mitigatable features located on and around the home to reduce a chance of a fire. A user may answer an inspection list of questions and provide accompanying images to identify these mitigatable features and thus reduce that a fire will arise. In another example, a fourth conventional approach may utilize sensors that collect data to identify mitigatable items located around a property. Once identified, the mitigatable items may be modified or removed to reduce a risk of a natural hazard linked to the property. In yet another example, a fifth conventional approach may identify areas prone to lightning disasters or forest fires to reduce incidents of lightning strikes or reduce occurrences of forest fires, respectively. In a further example, a sixth conventional approach may evaluate ecological risks, particularly due to pollutants. However, these conventional approaches require user inputs directly associated to a selected property to reduce a risk of a natural hazard such as fire when pertaining to trees. Otherwise, these conventional approaches do not consider tree risk, especially from trees or parts thereof from falling.

The exemplary embodiments are configured to proactively determine management strategies for trees by identifying a tree that is at risk of posing a hazard by determining the reason of a tree risk associated with the identified tree. As will be described in detail below, images of a geographic area including trees may be analyzed to detect one or more trees that have a tree risk that is greater than an acceptable threshold. The exemplary embodiments may determine hazards posed by trees that may be naturally created by present or predicted environmental factors or artificially created by construction work that negatively affects the condition of the tree. Through recognition of tree risk, the exemplary embodiments are configured to determine the management strategies that ensure trees are able to provide a full complement of benefits while minimizing tree risk.

The exemplary embodiments are described with regard to tree risk posed by trees in an urban environment. With greater population density and increased property locations in the urban environment, there may be more instances that trees cause injury to people or damage property. Accordingly, the exemplary embodiments may be directed toward the urban environment to minimize or eliminate such instances. However, the exemplary embodiments being directed to the urban environment and hazards posed by tree risk are only illustrative. The exemplary embodiments may be utilized in any geographic location to proactively prevent a hazard from tree risk. For example, the exemplary embodiments may be used in rural or suburban environments where injury or damage may also result. In another example, the exemplary embodiments may be used in areas neighboring urban environments that may indirectly affect trees in the urban environment. The exemplary embodiments being directed to hazards caused by tree risk is also only illustrative. The exemplary embodiments may be modified to proactively prevent hazards caused by other sources.

FIG. 1 depicts a tree management system 100, in accordance with the exemplary embodiments. The tree management system 100 may be used to manage tree risk for a selected geographic area using a centralized approach. According to the exemplary embodiments, the tree management system 100 may include one or more collection devices 110, one or more tree condition repositories 120, a tree maintenance server 130, and one or more dispatch devices 140 which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may include a communication channel capable of transferring data between connected devices. Accordingly, the components of the tree management system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the tree management system 100 that do not utilize the network 108.

In the exemplary embodiments, the collection device 110 may include a transfer client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. The collection device 110 may be associated with any entity or user who may capture an image within the geographic area. Accordingly, the collection device 110 may be equipped with an imager that generates the image. For example, the collection device 110 may be a personal or enterprise smart device where the imager may be a conventional camera capturing an image of a portion the geographic area within a field of view extending from the collection device 110. In another example, the collection device 110 may be part of a satellite including a satellite camera capturing satellite images of a portion of the geographic area. While the collection device 110 is shown as a single device, in other embodiments, the collection device 110 may be comprised of a cluster or plurality of computing devices, in a modular manner, etc., working together or working independently. The collection device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the transfer client 112 may act as a client in a client-server relationship and may be a software, hardware, and/or firmware based application capable of transmitting images captured by the collection device 110 of a portion of the geographic area to the tree condition repository 120 via the network 108. The transfer client 112 may perform further operations and utilize various wired and/or wireless connection protocols for data transmission and exchange associated with image transmission, including Bluetooth, 2.4 GHz and 5 GHz internet, near-field communication, Z-Wave, Zigbee, etc.

The transfer client 112 may receive images captured by an imager of the collection device 110. According to an exemplary embodiment, the collection device 110 may be a satellite or a smart device. Therefore, the images may be from the satellites that are associated with the tree maintenance server 130, from a population of users on which the transfer client 112 is installed on respective smart devices (e.g., personal devices, enterprise devices, etc.), from a portal on the network 108 (e.g., collected from further image repositories or further sources from which images are captured), etc. The transfer client 112 may transmit the images to be collected by the tree condition repository 120 according to various settings. For example, the transfer client 112 may transmit any image that is captured. In another example, the transfer client 112 may perform processing operations on the images prior to transmitting the images to the tree condition repository 120. The transfer client 112 may process the images to select which images to transmit to the tree condition repository 120. The transfer client 112 may determine whether the images include trees and select these images with trees to be transmitted to the tree condition repository 120.

The transfer client 112 may also provide imager specifications, corresponding location information, orientation information, a time stamp, etc. that is associated with each respective image that is transmitted to the tree condition repository 120. For example, when the collection device 110 is a smart device, the collection device 110 may be equipped with location components (e.g., GPS, triangulation, network signal positioning, etc.). The location components may determine where the collection device 110 is located and associate this information with the image. When the collection device 110 is a satellite, the collection device 110 may determine a longitude and latitude at which the satellite camera is aiming. The collection device 110 may associate this location information to the image captured with the satellite camera. In another example, the collection device 110 may also provide an orientation or a direction of a field of view of the imager. As will become apparent below, the orientation or direction may aid in isolating and identifying specific trees within the geographic region. The orientation or direction may also aid in reducing false positives such as when a first angle of a tree may be of poor quality leading to an indication of tree risk whereas a second angle of the tree may be of higher quality and not be indicative of tree risk. The orientation or direction may also include a height relative to a ground level or an amount of zoom such as when the collection device 110 is a satellite or a drone (e.g., described in the imager specifications).

The tree condition repository 120 may be any storage component that stores images collected from the collection device 110 via the transfer client 112 over the network 108. As illustrated, the tree condition repository 120 may be a remote storage component that is accessed by the tree maintenance server 130 via the network 108. However, in another exemplary embodiment, the tree condition repository 120 may be a storage component incorporated in the tree maintenance server 130. In a further exemplary embodiment, each of the collection devices 110 may include a respective tree condition repository 120. Thus, when the tree maintenance server 130 requires the images, the tree maintenance server 130 may request the images from the collection devices 110.

In the exemplary embodiments, the tree maintenance server 130 may include a risk program 132 and act as a server in a client-server relationship with the transfer client 112. The tree maintenance server 130 may also act as a server in a client-server relationship with a notification client 142 included in the dispatch device 140. The tree maintenance server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the tree maintenance server 130 is shown as a single device, in other embodiments, the tree maintenance server 130 may be comprised of a cluster or plurality of computing devices, working together or working independently. The tree maintenance server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the risk program 132 may be a software, hardware, and/or firmware application configured to identify a tree within the geographic area that may have a tree risk that poses a hazard. The risk program 132 may process images corresponding to the geographic area to determine whether any tree within the geographic area has an associated tree risk based on a plurality of reasons that the risk program 132 is configured to identify. The risk program 132 may be configured to identify different types of reasons that may linked to tree risk. For example, the reasons may include a regrowth from topping, line clearance or other pruning that may have been performed on a tree, a proximity to an electrical line that is adjacent to a tree, broken or partially attached branches on a tree, an open cavity in a truck or branch of a tree, dead or dying branches on a tree, branches arising from a single point on a trunk of a tree, decay and/or rot present in old wounds of a tree, recent changes in grade or soil level due to erosion or other construction, etc. The risk program 132 may modify or update the reasons using assorted manners. For example, an administrator may provide manual inputs that modify or update the reasons. In another example, the risk program 132 may receive historical information and/or results of actions taken on trees to modify or update the reasons using machine learning techniques.

The risk program 132 may select a portion of the geographic area and select an image collected in the tree condition repository 120 that corresponds to the selected portion. The risk program 132 may then select a tree within the selected image to be analyzed. The risk program 132 may identify further images collected in the tree condition repository 120 that also includes the selected tree. For example, based on a location of the selected tree in the geographic area, the risk program 132 may select the further images in the tree condition repository 120 that include a location identification that includes or overlaps with the location of the selected tree. The risk program 132 may determine which of the further images that include the selected tree. The risk program 132 may then process these one or more images to determine whether the selected tree has a tree risk that poses a hazard. For example, when the images include a satellite image, the risk program 132 may determine a proximity of the selected tree to one or more mains or one or more roofs. When the images include those collected from the population, the risk program 132 may determine signs of disease on the selected tree, situations of the branches and/or foliage of the selected tree, cavities in the changes of the selected tree, lesions on the selected tree, etc. In this manner, the risk program 132 may identify any of the reasons linked to tree risk that the selected tree may exhibit.

The risk program 132 may subsequently classify whether the selected tree is at risk of creating the hazard. For example, the risk program 132 may determine a probability associated with the tree risk related to a likelihood that the hazard will result based on the condition of the selected tree. The risk program 132 may determine a respective probability related to each reason linked to tree risk and assess these probabilities. As each reason linked to tree risk may vary in a likelihood that the selected tree will result in the hazard, the risk program 132 may normalize each probability and its assessment. For example, the risk program 132 may utilize a respective risk threshold for each reason. In another example, the risk program 132 may utilize a weighting system and apply a respective weight for the different reasons based on the likelihoods of resulting in the hazard for a given reason. The risk program 132 may then determine whether the tree risk associated with the selected tree is within an acceptable threshold. The risk program 132 may utilize the results of each probability individually or in a holistic manner. For example, in an individual approach, when at least one of the reasons has a probability that is greater than the corresponding risk threshold, the risk program 132 may classify the selected tree as not being within the acceptable threshold. In another example, in a holistic approach, the risk program 132 may classify the selected tree as not being within the acceptable threshold when the combined probabilities (e.g., a normalized combination) fall outside a range of the acceptable threshold.

The risk program 132 may be configured to determine further aspects that may impact the tree risk of the selected tree. For example, the risk program 132 may incorporate natural conditions including weather (e.g., precipitation, temperature, etc.) and wind conditions that may be experienced by the selected tree. As weather and wind may increase a degree of tree risk and a likelihood that a reason linked to tree risk may result in a hazard, the risk program 132 may receive predicted weather and wind conditions (e.g., from government and/or proprietary weather databases). In another example, the risk program 132 may determine artificial conditions that may be experienced by the selected tree. Construction vehicles, pedestrians, etc. may physically contact a selected tree that may alter a condition of the selected tree. The contact may affect the likelihood that a reason linked to tree risk may result in a hazard. Based on the natural and/or artificial conditions, the risk program 132 may determine how the reason linked to tree risk is affected and adjust the probability for the reason.

The risk program 132 may then analyze the selected tree based on the adjusted probability (e.g., relative to the acceptable threshold).

The risk program 132 may continue to perform these operations to identify each selected tree in the geographic area that has a tree risk greater than the acceptable threshold. The risk program 132 may then dispatch a team equipped to verify the tree risk for the selected trees and remediate the trees in the geographic area having the unacceptable tree risk upon confirmation. In this manner, the team may evaluate and confirm the classification of whether the selected tree as determined by the tree maintenance server 130 is compromised (e.g., having tree risk that poses a potential hazard). When a plurality of selected trees has been identified, the risk program 132 may be configured to prioritize the selected trees according to a severity of tree risk. For example, the risk program 132 may utilize various factors to prioritize the selected trees. The factors may include a location where selected trees close to areas of interest in the geographic area may be given priority (e.g., selected trees near schools, near hospitals, having increased circulation of people, being closer to electric grids or buildings, etc.). In another example, the risk program 132 may prioritize the selected trees based on severity such as by determining a difference between the probability of a selected tree to a corresponding risk threshold. The risk program 132 may prioritize the selected trees based on these differences where a greater difference is prioritized higher than a lesser difference. Based on this prioritization, the risk program 132 may dispatch the teams with selected trees having a greatest severity of tree risk being addressed before selected trees having a lower severity of tree risk but still greater than the acceptable threshold.

The risk program 132 may dispatch teams to the selected trees in a variety of manners. According to an exemplary embodiment, the risk program 132 may transmit a notification to the dispatch device 140 associated with a team. The risk program 132 may select the dispatch device 140 and the team based on a plurality of characteristics. For example, when the selected trees are determined before the teams have left a centralized location (e.g., before a shift), the dispatch device 140 may determine a schedule including one or more of the selected trees for the team to visit (e.g., isolated to a portion of the geographic area). In another example, the dispatch device 140 may select a team based on a location of the selected tree and a location of the team (e.g., a team closest to a selected tree is selected).

The dispatch device 140 may include a notification client 142 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. The dispatch device 140 may be associated with a team equipped to confirm a condition of a tree risk and evaluate tree risk that poses a hazard. While the dispatch device 140 is shown as a single device, in other embodiments, the dispatch device 140 may be comprised of a cluster or plurality of computing devices, in a modular manner, etc., working together or working independently. The dispatch device 140 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the notification client 142 may act as a client in a client-server relationship with the tree maintenance server 130 and may be a software, hardware, and/or firmware based application providing a user interface for the team associated with the dispatch device 140. In the exemplary embodiments, the notification client 142 may receive a notification from the risk program 132 of the tree maintenance server 130 regarding at least one selected tree to visit by the team for evaluation and confirmation that the at least one selected tree has a tree risk that poses a hazard. Thus, upon confirmation that any of the at least one selected tree has a tree risk that poses a hazard as determined by the risk program 132, the team may take appropriate action to remediate the condition of the selected tree. The notification client 142 may perform further operations and utilize various wired and/or wireless connection protocols for data transmission and exchange associated with image transmission, including Bluetooth, 2.4 GHz and 5 GHz internet, near-field communication, Z-Wave, Zigbee, etc.

Initially, the risk program 132 may generate the notification to include various types of information. As described above, the risk program 132 may determine an identification and a location of a selected tree that has a tree risk that poses a hazard. The identification and the location may be part of the information included in the notification. In addition to determining the identification and the location of the selected tree, the risk program 132 may be configured to perform further operations to determine the information to be included in the notification. For example, the risk program 132 may be configured to determine a reason that the selected tree has a tree risk that poses a hazard. In analyzing tree risk for each reason, the risk program 132 may determine the reason based on the result of the analysis relative to a corresponding risk threshold. Accordingly, the risk program 132 may include an indication in the notification for the team that is dispatched of a possible reason that the selected tree has been identified. In another example, the risk program 132 may be configured to identify a disease that may be afflicting the selected tree (e.g., based on tree species and a likelihood of the tree species contracting a particular disease or suffer a particular injury). The risk program 132 may include an indication in the notification for the team that is dispatched to evaluate for these diseases or conditions to which the selected tree may be prone. In a further example, the risk program 132 may be configured to determine a possible solution that remediates the condition of the tree to alleviate the tree risk and reduce the likelihood of the hazard. The risk program 132 may be programmed with various solutions, utilize historical information and results that may provide insight to subsequent reasons through machine learning algorithms, etc. For example, the risk program 132 may suggest pruning of a selected tree, a treatment for a disease, a removal of the selected tree, planting of a new tree, etc. The risk program 132 may include an indication in the notification of one or more solutions to inform the team that is dispatched for the selected tree.

The notification client 142 may provide a user interface for the team being dispatched. Once the risk program 132 has selected a team and identified the dispatch device 140 associated with the team, the risk program 132 may transmit the notification including the various types of information. As a result of the notification client 142 receiving the notification, the user interface may display the various types of information. For example, the user interface may show a location of a selected tree assigned to the team. The user interface may show an address, a longitude-latitude combination, etc. as text, in a map, etc. The user interface may also show an exact position of the selected tree at a given address based on a location of the selected tree determined by the risk program 132 (e.g., a distance from a street position). In another example, the user interface may show the reason for why the risk program 132 has determined that the selected tree has a tree risk posing a hazard as well as any solution that may be used to remediate the condition of the selected tree.

After the team has performed any appropriate action to remediate a selected tree as determined by the risk program 132 and evaluated by the team associated with the dispatch device 140, the team may utilize the dispatch device 140 to provide feedback or receive additional instructions from the tree maintenance server 130. For example, after performing the appropriate action, the team may enter inputs in the notification client 142 or a further client indicating the work performed on the selected tree. In this manner, the risk program 132 may update a database or information related to the selected tree. In another example, the team may utilize the dispatch device 140 or a member of the team may have a collection device 110 to capture a new image of the selected tree after the appropriate action has been performed which is provided to the risk program 132. The risk program 132 may perform a substantially similar set of operations described above with regard to determining tree risk posing a hazard. If the risk program 132 determines that the selected tree is in a condition where the tree risk is within the acceptable threshold, the team may be notified as such and move onto another selected tree or return to a centralized location. If the risk program 132 determines that the selected tree still has a reason for having a tree risk that is not within the acceptable threshold, the risk program 132 may transmit a further notification that includes this new information. For example, in working on a selected tree, a different reason may have been exacerbated or created. When appropriate, the team may also transmit images of neighboring trees that may have been affected by the work performed on the selected tree. The risk program 132 may then process these neighboring trees for tree risk. In this manner, the tree maintenance server 130 may streamline a process of remediating tree risk for the selected tree and any neighboring tree.

The tree management system 100 illustrated in FIG. 1 shows a centralized approach using a network implementation to proactively determine tree risk for trees in a geographic area that poses a hazard. For example, the tree maintenance server 130 may be responsible for monitoring the trees in the geographic area where the geographic area may encompass a predetermined area, a block, a town, a city, a state, a province, a country, the globe, etc. The centralized approach may allow an administrator responsible for monitoring the trees in an assigned geographic area to oversee tree risk. The centralized approach may also be implemented for an entity responsible for maintaining trees over a relatively large geographic area (e.g., a town, a city, etc.). However, the tree management system 100 being centralized with a single tree maintenance server 130 is only illustrative. In another exemplary embodiment, the tree management system 100 may include a plurality of tree maintenance servers 130 each respectively assigned a portion of the geographic area. Accordingly, each of the tree maintenance servers 130 may allow a corresponding administrator who is responsible for a respective portion of the geographic area.

In a further exemplary embodiment, the tree management system 100 may utilize a remote approach in which a portable device at a geographic area may analyze trees in the geographic area for tree risk posing a hazard. The remote approach may allow a team at the geographic area to analyze the trees therein. With the team already dispatched at the geographic area, the team may evaluate any selected tree that is determined to have a tree risk posing a hazard to perform an appropriate action to remediate the condition of the selected tree. In this manner, the remote approach according to this further exemplary embodiment may utilize an entirely contained portable device that performs the operations described above in a network environment. The remote approach may also enable a personal maintenance of trees. For example, the remote approach may be implemented for an entity responsible for maintaining trees within a property boundary (e.g., a home owner).

The exemplary embodiments are described with regard to dispatching a team to remediate a condition of a selected tree. The team may have a permission to perform work on trees in the geographic area. For example, the individuals on the team may work for a city in which the geographic area encompasses. In another example, the individuals on the team may work for an organization or entity responsible for management of trees in the geographic area. In a further example, the individuals on the team or an organization with which the team is associated may be contractors with the city or entity. In this manner, the team may have a prior authorization to perform the work on the trees in the geographic area. In another exemplary embodiment, as described above, individuals or civilians who own or are otherwise responsible for trees in the geographic area may perform work on the trees or hire contractors to perform work on the trees. Depending on the location of the geographic area (e.g., city ordinances, laws based on federal, state, county, etc.), a civilian may require a permit to perform work (e.g., to cut down a tree, to prune branches beyond a predetermined amount, etc.). In determining when a selected tree in the geographic area has a tree risk beyond the acceptable threshold, the tree maintenance system 100 may be configured to generate an appropriate permit for the civilian. Thus, work that may be performed as a result of a determination of the tree maintenance system 100 may be permitted without legal repercussions tied to tree maintenance.

Figure 2:
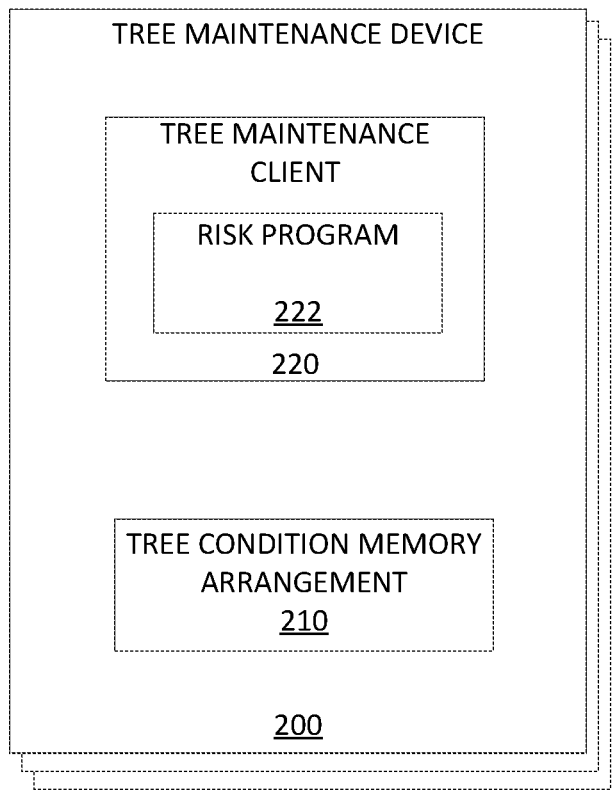
FIG. 2 depicts an exemplary schematic diagram of a tree management device 200, in accordance with the exemplary embodiments.

FIG. 2 depicts a tree management device 200, in accordance with the exemplary embodiments. The tree management device 200 may perform operations substantially similar to the risk program 132 of the tree maintenance server 130 and the transfer client 112 of the collection device 110. In the exemplary embodiments, the tree maintenance device 200 may include a tree condition memory arrangement 210 and a tree maintenance client 220 including a risk program 222 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. In a particular embodiment, the tree maintenance device 200 may be a portable device associated with a team that is dispatched to remediate conditions of trees having a tree risk that poses a hazard. Accordingly, in a substantially similar manner as the collection device 110, the tree maintenance device 200 may be equipped with an imager that generates an image for processing, and, in a substantially similar manner as the risk program 132 of the tree maintenance server 130, the tree maintenance device 200 may analyze trees in the geographic area and provide results to the team. While the tree maintenance device 200 is shown as a single device, in other embodiments, the tree maintenance device 200 may be comprised of a cluster or plurality of computing devices, in a modular manner, etc., working together or working independently (e.g., a separate imager that transmits images to the tree maintenance device 200). The tree maintenance device 200 is described in greater detail as a hardware implementation with reference to FIG. 4, as part of a cloud implementation with reference to FIG. 5, and/or as utilizing functional abstraction layers for processing with reference to FIG. 6.

The tree condition memory arrangement 210 may provide substantially similar features as the tree condition repository 120. For example, the team may utilize an imager of the tree maintenance device 200 to capture images of the geographic area at which the team has arrived. The images may be collected in the tree condition memory arrangement 210 for subsequent processing.

The tree maintenance client 220 may act as a client providing a user interface to the team and may be a software, hardware, and/or firmware based application capable of processing the images in the tree condition memory arrangement 210 for trees located in the geographic area via the risk program 222. In the exemplary embodiments, tree maintenance client 220 may receive inputs from the team to navigate the features provided by the risk program 222 in analyzing the trees for selected trees that have tree risk that poses a hazard. Accordingly, the risk program 222 may be substantially similar to the risk program 132 and may perform substantially similar operations as those described above.

In using the remote approach versus the centralized approach, the team may already be at a geographic area in which trees are to be analyzed. The geographic area may be a confined area such as a stretch of a street, a city block, etc. that has been assigned to the team. While dispatched at the geographic area, the team may use the tree maintenance device 200 to capture images of the trees that are collected in the tree condition memory arrangement 210. The team may then enter an input on the tree maintenance client 220 for the risk program 222 to determine whether the trees in the collected images have a tree risk posing a hazard. Using the operations described above in a substantially similar manner as performed by the risk program 132, the risk program 222 may determine selected trees in the geographic area having a tree risk posing a hazard. The tree maintenance client 220 may show the results of the risk program 132 to the team for further evaluation. With the team already at the geographic area, the team may identify the location of a selected tree and determine whether the selected tree is compromised (e.g., requires an appropriate action to remediate a condition that poses the hazard).

The tree maintenance device 200 may further be used to instruct the team after working on a selected tree. The team may use the tree maintenance device 200 to capture images of the selected tree on which work had been performed. The risk program 222 may again determine whether the selected tree or determine whether a neighboring tree has subsequently changed a tree risk that poses a hazard. The team may continue this process and evaluate whether selected trees have a tree risk posing a hazard while the team remains in the geographic area.

In yet another implementation according to the exemplary embodiments, the features of the tree maintenance device 200 of FIG. 2 may be incorporated in the tree maintenance system 100 of FIG. 1. For example, the tree maintenance device 200 may replace the dispatch device 140 of the tree maintenance system 100. In another example, the tree maintenance client 220 may be incorporated in the dispatch device 140 of the tree maintenance system 100. According to this implementation, the tree maintenance server 130 may transmit a notification to the team associated with the dispatch device 140. The team may then utilize the features of the tree maintenance client 220 while at the location of the selected tree identified by the tree maintenance server 130. For example, after confirming that the selected tree has a tree risk that poses a hazard and taking appropriate action to remediate the condition of the selected tree, the team may capture new images of the selected tree and/or neighboring trees that are evaluated by the dispatch device 140. In contrast to the network implementation that uses the tree maintenance server 130 for each determination of tree risk, the tree maintenance client 220 may provide an immediate feedback to the team while at the location of the selected tree. In such an implementation, the dispatch device 140 may transmit data corresponding to any feedback or additional work to the tree maintenance server 130 for the tree maintenance server 130 to update a database including information of trees in the geographic area.

Figure 3:
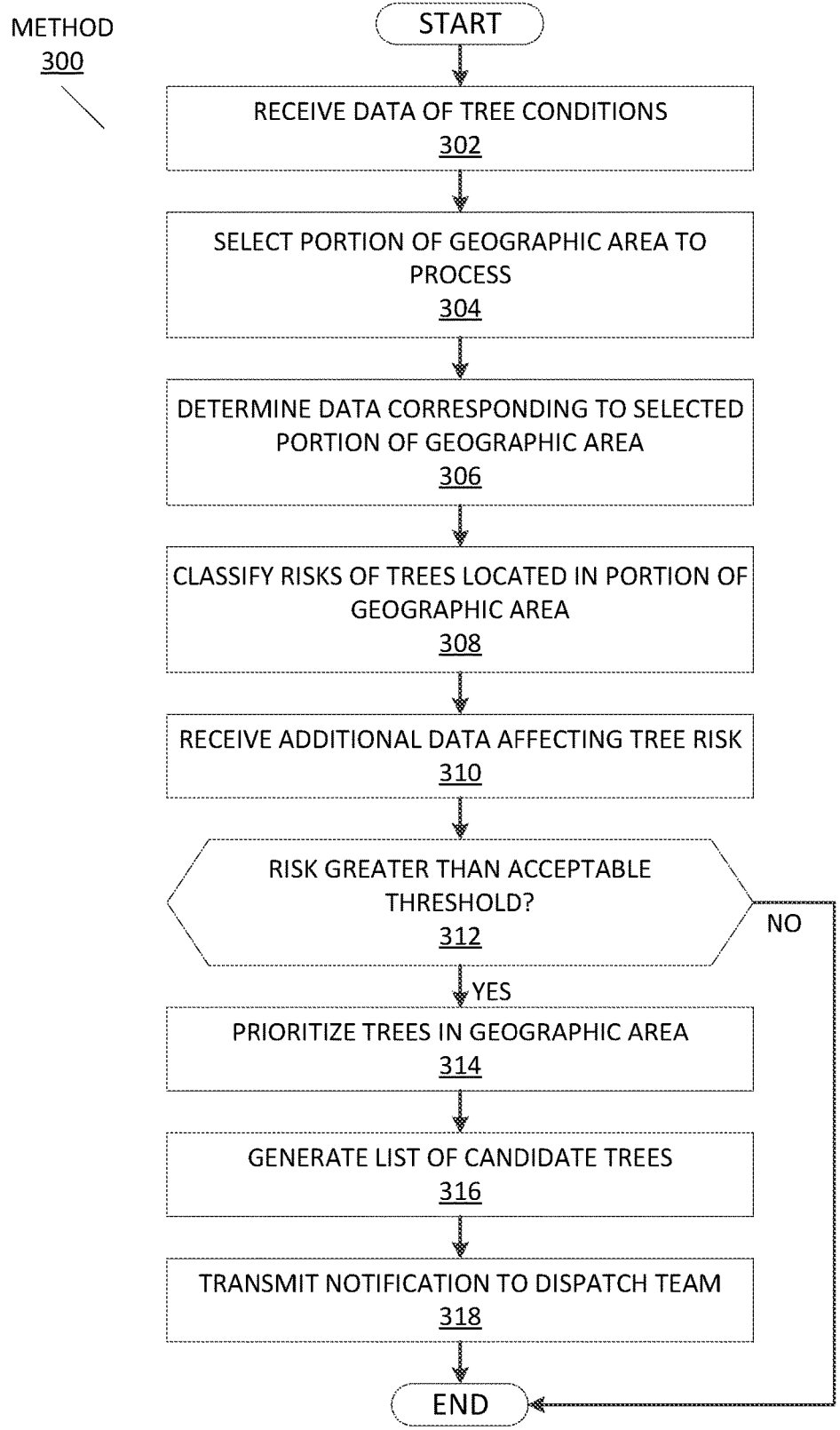
FIG. 3 depicts an exemplary flowchart of a method illustrating the operations of a risk program 132 of the tree management system 100 in managing tree risk, in accordance with the exemplary embodiments.

FIG. 3 depicts an exemplary flowchart of a method 300 illustrating the operations of a risk program 132 of the tree management system 100 in warning workers of hazardous conditions, in accordance with the exemplary embodiments. For illustrative purposes, the method 300 is described with regard to the centralized approach using the network implementation as described above with regard to the tree maintenance system 100 of FIG. 1. However, the method 300 may be modified to represent operations as performed by the tree maintenance device 200 corresponding to the remote approach of FIG. 2 or a combined approach using features of both the tree maintenance system 100 of FIG. 1 and the tree maintenance device 200 of FIG. 2.

The risk program 132 may receive data of tree conditions (step 302). The data may be images captured by an imager of the collection device 110 that are transmitted by the transfer client 112 to be collected by the tree condition repository 120. The collection device 110 may be a personal smart device, a satellite, etc. The collection device 110 may associate information with each image such as location information. Thus, the tree condition repository 120 may store the various images and corresponding accompanying information associated with the image. The risk program 132 may access the tree condition repository 120 for the images that have been collected. In an exemplary embodiment, the risk program 132 may selectively request images from the tree condition repository 120 based on a portion of the geographic area to be processed.

To further illustrate the operations of the risk program 132, reference is now made to an illustrative example. According to the illustrative exemplary embodiment, a geographic area may be an urban environment that includes a city block in which trees spaced apart from one another line the streets. The street may have power lines that extend along the street at a predetermined height. A satellite may be a collection device 110 positioned over the urban environment to capture images of the trees in the city block. In generating the images, the satellite may associate longitude and latitude values corresponding to a center of the image. Individuals in a population in the city block may use personal smart devices that are further collection devices 110 that capture images of the trees in the city block. In generating the images, the smart devices may associate location information, imager specification information, imager orientation information, etc. corresponding to where and how the images are captured.

The risk program 132 may select a portion of the geographic area to process (step 304). In selecting the portion of the geographic area, the risk program 132 may separate the geographic area into a plurality of portions (e.g., a grid encompassing substantially similar areas). In an exemplary embodiment, the risk program 132 may objectively select one of the portions to begin processing trees in the geographic area. In another exemplary embodiment, the risk program 132 may utilize historical information (e.g., a database of current and previous statuses) to select a portion of the geographic area. For example, the risk program 132 may select the portion of the geographic area that previously had a tree having a tree risk that was under the acceptable threshold. However, the condition of the tree may be susceptible to having a tree risk that exceeds the acceptable threshold. The risk program 132 may select the portion of the geographic area including the tree and prioritize the portions of the geographic area based on a susceptibility standard.

With reference again to the previously introduced example, the risk program 132 may access a database indicating statuses of trees in the geographic area. The database may reveal that, at a prior time that the trees in the geographic area were analyzed, a tree in a portion of the geographic area had a branch growing toward a power line but not to a degree that the tree had a tree risk that exceeded the acceptable threshold for appropriate action to immediately be performed. In determining a passage of time from the prior time to a current time, the risk program 132 may decide that the branch of the tree may have grown even closer to the power line. Based on the susceptibility of this scenario, the risk program 132 may select the portion of the geographic area including this tree.

The risk program 132 may determine data corresponding to the selected portion of the geographic area (step 306). The risk program 132 may identify images collected in the tree condition repository 120 that correspond to the selected portion of the geographic area. As each image collected in the tree condition repository 120 may have respective location information that is associated with the image, the risk program 132 may determine each image having location information that corresponds to the selected portion of the geographic area.

Referring now to the previously introduced, illustrative example, the tree condition repository 120 may have collected a plurality of different images of trees in the geographic area. Among the satellite images and the population images, the risk program 132 may determine which of these images have location information that corresponds to the selected portion of the geographic area. The images that have location information corresponding to the selected portion of the geographic area may relate to images that focus on the selected portion of the geographic area (e.g., a majority of the image contains the selected portion of the geographic area) or peripherally includes the selected portion of the geographic area (e.g., the selected portion of the geographic area is included in a minority of the image, in a background of the image, etc.). The risk program 132 may also utilize a time stamp corresponding to when the image was captured. For example, the risk program 132 may select the images where the time stamp indicates a time between the prior time that the trees were analyzed and a current time.

The risk program 132 may classify risks of the trees located in the selected portion of the geographic area (step 308). Based on a plurality of reasons that may contribute to tree risk that poses a hazard to people or property, the risk program 132 may analyze trees in the selected portion of the geographic area relative to the reasons. For example, the risk program 132 may determine a probability for a selected reason that a condition of a tree in the selected portion of the geographic area may have. The risk program 132 may assess the probability relative to a risk threshold associated with the reason. The risk program 132 may classify a tree risk for each tree in the selected portion of the geographic area based on the probabilities.

With reference again to the illustrative example, the risk program 132 may utilize the one or more images collected in the tree condition repository 120 to analyze each tree included in the selected portion of the geographic area. For each tree, the risk program 132 may determine a respective tree risk. As noted above, a tree in the selected portion of the geographic area may have a branch growing toward a power line. The images including the tree may show a degree that the branch may interact with the power line. In a current state, the branch of the tree may have grown to contact the power line and around the power line. Accordingly, the risk program 132 may assess the reason for a power line being adjacent to the tree. The risk program 132 may determine a probability that the reason of the adjacent power line contributes to tree risk and pose a hazard. The risk program 132 may have assessed further reasons and determine corresponding probabilities.

The risk program 132 may receive additional data that affects tree risk (step 310). There may be factors that may impact tree risk beyond the condition of the tree itself. For example, a natural condition that may impact tree risk may be weather and/or wind conditions. When a strong wind condition is predicted, the condition of the tree may be impacted such as a reason being exacerbated. When a precipitation event is predicted, the condition of the tree may further be impacted where a reason that may have a relatively low probability to pose a hazard may be affected to a degree that increases that probability. In another example, an artificial condition that may impact tree risk may be predicted construction work on or around the tree. As construction vehicles may interact or contact the tree, certain reasons may have an increased probability to pose a hazard. As a result of receiving the additional data and the manner in which the reasons of a tree may be affected, the risk program 132 may reassess each probability for the various reasons.

Returning to the previously introduced example, the risk program 132 may have access to a weather database that provides weather and wind data for requested geographic locations. The risk program 132 may receive the predicted weather and wind conditions for the selected portion of the geographic area. The predicted weather and wind conditions may indicate that there is a high likelihood that the selected portion of the geographic area will receive rain and experience high winds. Based on the predicted weather and wind conditions, the risk program 132 may determine the impact that the rain and wind may have on the branch that is adjacent the power line. For example, the risk program 132 may determine that the winds may cause the branch to contact the power line or possibly break the power line. Accordingly, the risk program 132 may adjust the probability for the reason of the adjacent power line such that the probability of posing a hazard increases.

The risk program 132 may determine whether a tree risk of a tree in the selected portion of the geographic area is greater than an acceptable threshold (decision 312). The acceptable threshold may be determined based on various standards. For example, the standard may be whether any probability exceeds a respective risk threshold. Thus, when at least one probability exceeds the respective risk threshold, the risk program 132 may determine that the tree risk is greater than the acceptable threshold. As a result of the tree risk being at most the acceptable threshold (decision 312, "NO" branch), the risk program 132 may determine that the tree does not pose a hazard and no appropriate action is required at this time. As a result of the tree risk being greater than the acceptable threshold (decision 312, "YES" branch), the risk program 132 may perform subsequent operations to remediate the condition of the tree to reduce the tree risk and the likelihood that a hazard is posed.

Continuing with the illustrative example, the risk program 132 may determine that the tree risk associated with the tree having the reason of the adjacent power line is greater than an acceptable threshold due to the probability of posing a hazard from the branch contacting the power line being greater than a risk threshold. Thus, the risk program 132 may perform subsequent operations that may remediate the condition of the tree having a branch that is adjacent to the power line.

When the condition of the tree is to be remediated, the risk program 132 may prioritize trees in the geographic area (step 314). When the selected portion of the geographic area includes a plurality of trees, the risk program 132 may analyze each of these trees. As a result of the analysis, the risk program 132 may identify one or more trees having a tree risk that is greater than the acceptable threshold. As a result of a plurality of trees having a tree risk greater than the acceptable threshold, the risk program 132 may prioritize the trees to determine an order in which to remediate the condition of the trees. For example, the risk program 132 may utilize overriding factors to prioritize the trees. The overriding factor may be a location of the tree and the hazard that may be posed (e.g., proximity to a school, a hospital, etc.). In another example, the risk program 132 may based the prioritization according to a severity of the tree risk. The risk program 132 may determine which of the trees has a highest tree risk (e.g., greatest difference from the acceptable threshold) to prioritize first, and sequence the remaining trees based on a similar process. In a further example, the risk program 132 may utilize a combination of these approaches that balances the overriding factors and the severity of the tree risk. Using the prioritization, the risk program may generate a list of candidate trees that are to be remediated (step 316).

In furtherance to the illustrative example, in addition to the tree having a branch that is adjacent to the power line, the risk program 132 may have determined a further tree in the selected portion of the geographic area having an open cavity in a branch that has a tree risk that is also greater than the acceptable threshold. The risk program 132 may utilize a balance between overriding factors and severity of tree risk to prioritize an order to remediate the trees. The tree having a branch adjacent a power line may be located near a hospital whereas the tree having an open cavity may be relatively isolated. Thus, based on the overriding factors, the risk program 132 may prioritize the tree having a branch adjacent a power line. The tree having a branch adjacent a power line may also have a greater severity to pose a hazard (e.g., a greater difference between the probability and the risk threshold) than the tree having an open cavity. Thus, based on the severity of tree risk, the risk program 132 may again prioritize the tree having a branch adjacent a power line. Accordingly, in this scenario, the risk program 132 may rank the tree having a branch adjacent a power line above the tree having the open cavity.

The risk program 132 may transmit a notification to a team via the notification client 142 of the dispatch device 140 (step 318). The risk program 132 may select a team equipped to confirm the determination of a tree having a tree risk that poses a hazard (e.g., greater than the acceptable threshold) and perform appropriate action to remediate the condition of the determined and confirmed tree. The risk program 132 may select the team using a proximity standard (e.g., a team closest to the tree), a schedule before the team is dispatched, etc. In generating the notification, the risk program 132 may be configured to determine a reason for why the risk program 132 determined that the tree has a tree risk that poses a hazard, identify causes for why the tree has been determined to have a tree risk that poses a hazard, determine solutions that may be used to remediate the condition of the determined tree, etc. The risk program 132 may include the identification of the tree as well as further information in the notification that is transmitted to the team.

Returning to the illustrative example, the risk program 132 may generate a notification. The notification may identify each of the trees in the selection portion of the geographic area that has a tree risk posing a hazard that is greater than an acceptable threshold. The risk program 132 may generate the notification that prioritizes the trees where the tree with the branch adjacent the power line is prioritized over the tree with the open cavity. The risk program 132 may also be configured to indicate the reason for why the tree is determined to require appropriate action and determine a solution to remediate the identified reason. For example, with the tree with the branch adjacent the power line, the risk program 132 may indicate in the notification a solution to prune the branch so that the branch is no longer adjacent the power line. The risk program 132 may also provide specific instructions to prune the branch so that the branch will not subsequently be adjacent the power line at a future time. The risk program 132 may include these various types of information and generate the notification. The risk program 132 may select a team based on proximity to the selected portion of the geographic area. As a result of identifying the closest team to the selected portion of the geographic area including the trees included in the notification, the risk program 132 may transmit the notification to this team.

As a result of the team receiving the notification, the team may travel to the selected portion of the geographic area. The team may evaluate the trees indicated in the notification and confirm whether appropriate action is required due to the tree having a tree risk that poses a hazard above an acceptable threshold. Upon confirmation, the team may perform the appropriate action on the tree by utilizing the solution that is provided or utilize a different approach to remediate the condition of the tree.

The method 300 may include further operations that are performed by the risk program 132. For example, the risk program 132 may maintain a database indicating statuses and historical information of the trees included in the geographic area. In another example, as described above, the team may provide feedback to the risk program 132 about work performed on indicated trees. The risk program 132 may update the database corresponding to this feedback. The team may also capture further images of the trees after work has been performed and/or neighboring trees. The risk program 132 may analyze the tree and/or the neighboring trees to determine whether the tree or any of the neighboring trees have a tree risk that poses a hazard above an acceptable threshold. As a result of any tree included in images captured by the team having a tree risk above the acceptable threshold, the risk program 132 may perform substantially similar operations described above via a further notification.

The exemplary embodiments are configured to proactively manage tree risk by preventing hazards that may be posed by trees. By analyzing images of trees in a geographic area, the exemplary embodiments may determine whether the trees have a tree risk that pose a hazard and identify any tree that may require appropriate action to remediate a condition of the trees. Through this proactive approach in determining trees to remediate, the exemplary embodiments may generate a notification that is transmitted to a team equipped to remediate the condition of the trees.

Figure 4:
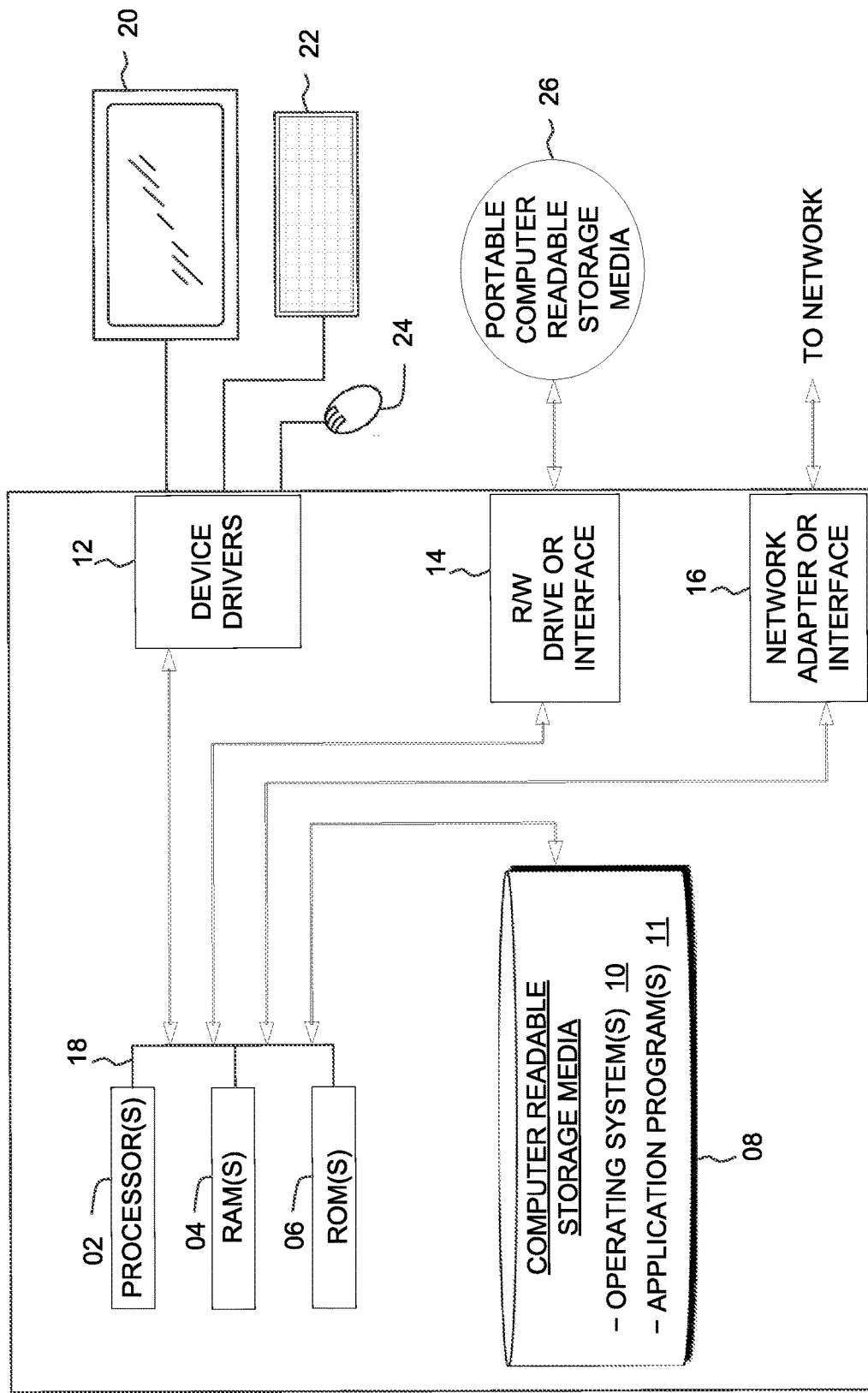
FIG. 4 depicts an exemplary block diagram depicting the hardware components of the tree management system 100 of FIG. 1, in accordance with the exemplary embodiments.

FIG. 4 depicts a block diagram of devices within the tree management system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad

24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
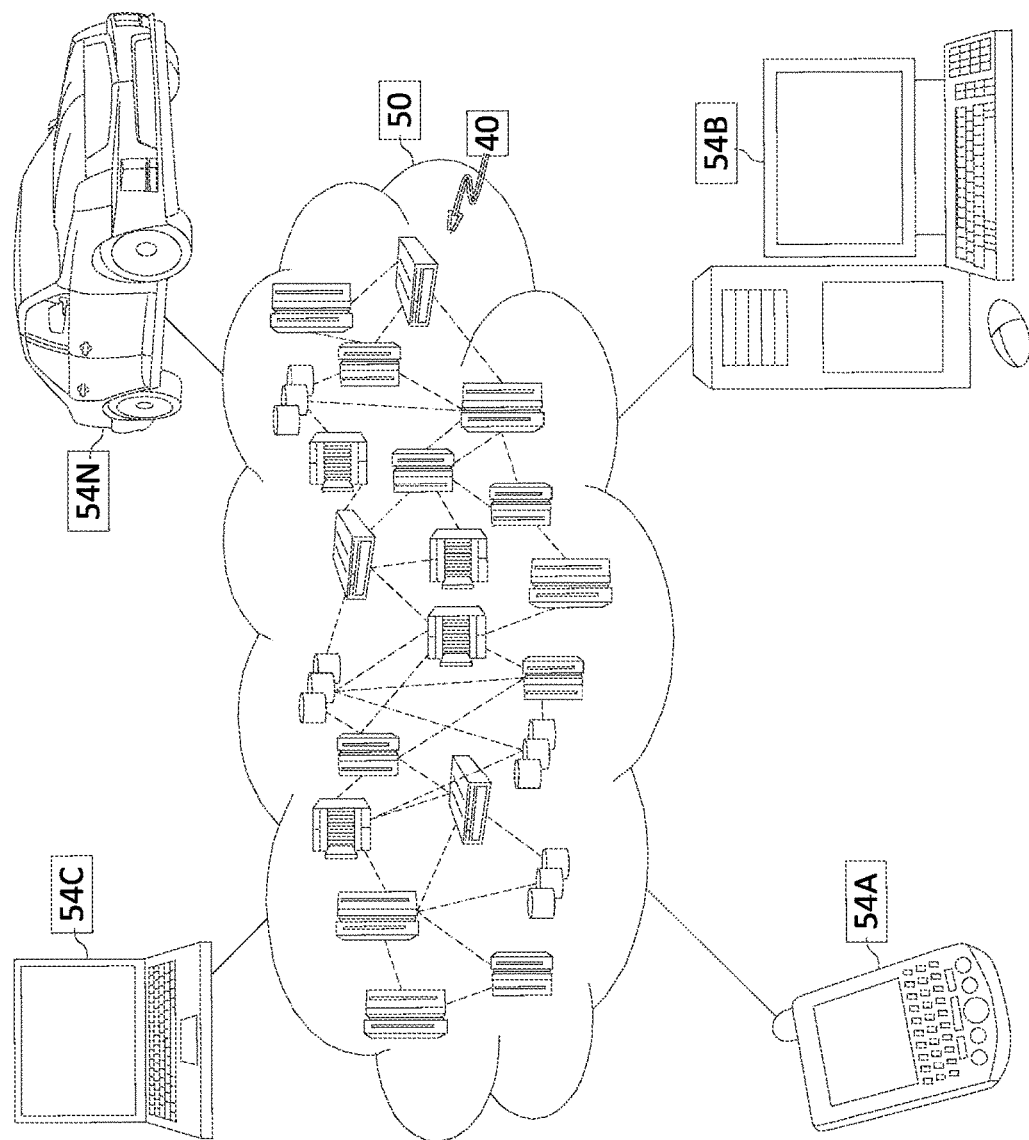
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
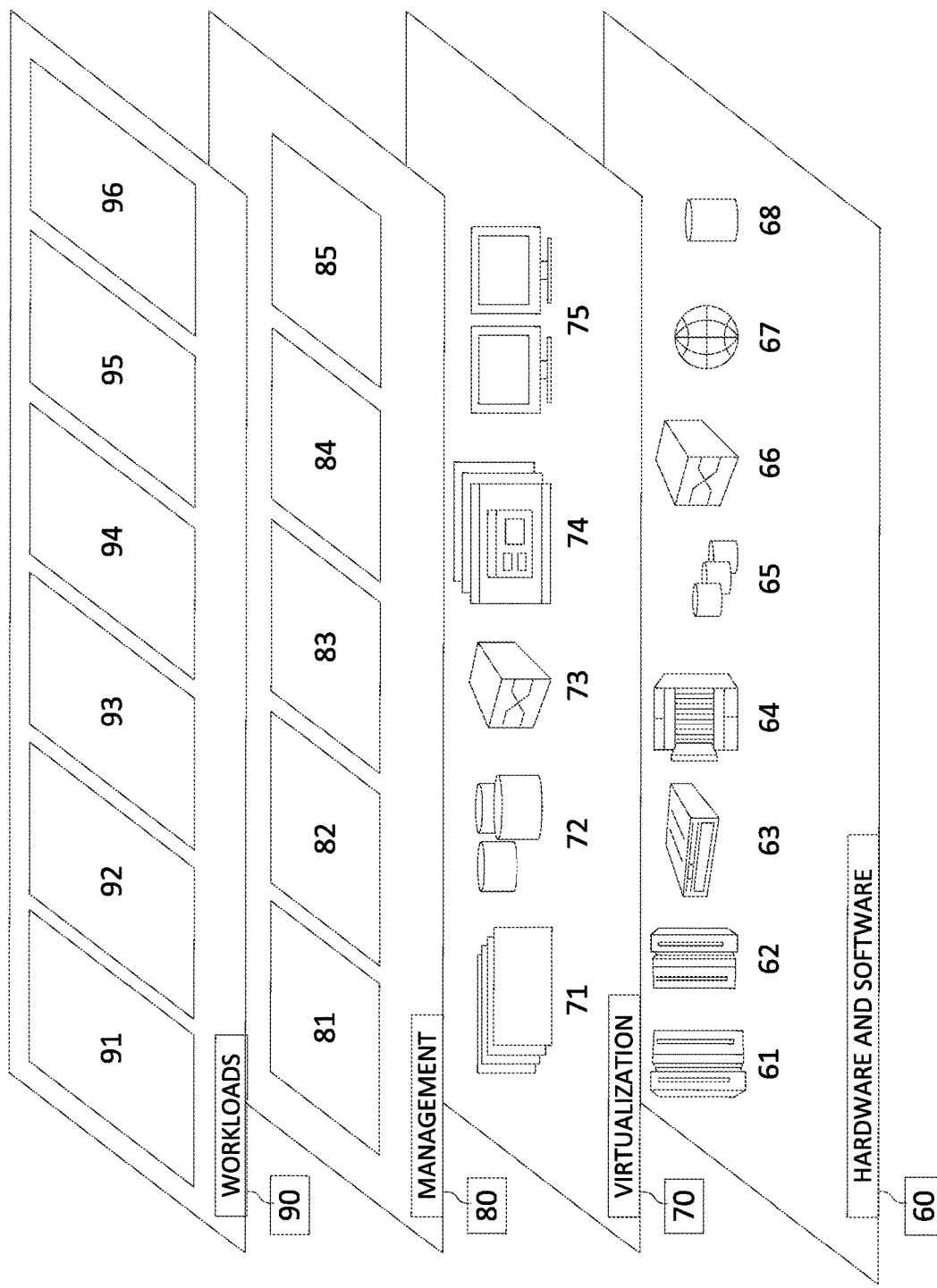
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tree risk processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for managing tree risk, the method comprising:
   receiving images corresponding to a geographic area, the images indicative of conditions of trees located in the geographic area;
   selecting a portion of the geographic area;
   determining select images from the images corresponding to the portion of the geographic area, the select images including trees located in the portion of the geographic area from the trees;
   classifying a respective risk associated with each of the trees located in the portion of the geographic area;
   determining indicated trees from the trees located in the portion of the geographic area, the indicated trees having the respective risk greater than an acceptable threshold;
   determining a prioritization for the indicated trees based on the respective risk;
   generating a notification identifying the indicated trees and a respective location of the indicated trees; and
   transmitting the notification to a team equipped to remediate a hazard of the indicated trees, the notification indicating an order in which to remediate the hazard of the indicated trees based on the prioritization.

2. A computer program product for managing tree risk, the computer program product comprising:
   one or more non-transitory computer-readable storage media and program instructions stored on the one or more non-transitory computer-readable storage media capable of performing a method, the method comprising:
   receiving images corresponding to a geographic area, the images indicative of conditions of trees located in the geographic area;
   selecting a portion of the geographic area;
   determining select images from the images corresponding to the portion of the geographic area, the select images including trees located in the portion of the geographic area from the trees;
   classifying a respective risk associated with each of the trees located in the portion of the geographic area;
   determining indicated trees from the trees located in the portion of the geographic area, the indicated trees having the respective risk greater than an acceptable threshold;
   determining a prioritization for the indicated trees based on the respective risk;
   generating a notification identifying the indicated trees and a respective location of the indicated trees; and
   transmitting the notification to a team equipped to remediate a hazard of the indicated trees, the notification indicating an order in which to remediate the hazard of the indicated trees based on the prioritization.

3. A computer system for managing tree risk, the computer system comprising:
   one or more computer processors, one or more computer-readable storage media, and program instructions stored on the one or more of the computer-readable storage media for execution by at least one of the one or more processors capable of performing a method, the method comprising:
   receiving images corresponding to a geographic area, the images indicative of conditions of trees located in the geographic area;
   selecting a portion of the geographic area;
   determining select images from the images corresponding to the portion of the geographic area, the select images including trees located in the portion of the geographic area from the trees;
   classifying a respective risk associated with each of the trees located in the portion of the geographic area;
   determining indicated trees from the trees located in the portion of the geographic area, the indicated trees having the respective risk greater than an acceptable threshold;
   determining a prioritization for the indicated trees based on the respective risk;

generating a notification identifying the indicated trees and a respective location of the indicated trees; and transmitting the notification to a team equipped to remediate a hazard of the indicated trees, the notification indicating an order in which to remediate the hazard of the indicated trees based on the prioritization.

4. The computer-implemented method of claim 1, wherein the images that are received are captured by an imager of a satellite, an imager of a device of a population, or a combination thereof.

5. The computer-implemented method of claim 1, wherein the determining the indicated trees comprises:
   selecting a reason associated with posing the hazard;
   determining a probability of the reason posing the hazard; and
   determining whether the probability is greater than a risk threshold associated with the reason,
   wherein one of the indicated trees poses the hazard when the probability is greater than the risk threshold.

6. The computer-implemented method of claim 5, wherein the reasons include a regrowth from work performed on the one of the indicated trees, a proximity of the one of the indicated trees to an electrical line, broken or partially attached branches of the one of the indicated trees, an open cavity on the one of the indicated trees, dead or dying branches on the one of the indicated trees, branches of the one of the indicated trees arising from a single point on a trunk, at least one of decay and rot in old wounds of the one of the indicated trees, a recent change in one of grade, soil level, or other construction around the one of the indicated trees, or a combination thereof.

7. The computer-implemented method of claim 5, further comprising:
   receiving data indicative of a natural condition that impacts the condition of the one of the indicated trees;
   determining a further probability of the reason posing the hazard based on the impacted condition of the one of the indicated trees; and
   determining whether the further probability is greater than the risk threshold associated with the reason,
   wherein the one of the indicated trees poses the hazard when the further probability is greater than the risk threshold.

8. The computer-implemented method of claim 7, wherein the natural condition is at least one of a weather condition and a wind condition.

9. The computer-implemented method of claim 1, wherein the geographic area is an urban environment.

10. The computer program product of claim 2, wherein the images that are received are captured by an imager of a satellite, an imager of a device of a population, or a combination thereof.

11. The computer program product of claim 2, wherein the determining the indicated trees comprises:
    selecting a reason associated with posing the hazard;
    determining a probability of the reason posing the hazard; and
    determining whether the probability is greater than a risk threshold associated with the reason,
    wherein one of the indicated trees poses the hazard when the probability is greater than the risk threshold.

12. The computer program product of claim 11, wherein the reasons include a regrowth from work performed on the one of the indicated trees, a proximity of the one of the indicated trees to an electrical line, broken or partially attached branches of the one of the indicated trees, an open cavity on the one of the indicated trees, dead or dying branches on the one of the indicated trees, branches of the one of the indicated trees arising from a single point on a trunk, at least one of decay and rot in old wounds of the one of the indicated trees, a recent change in one of grade, soil level, or other construction around the one of the indicated trees, or a combination thereof.

13. The computer program product of claim 11, further comprising:
    receiving data indicative of a natural condition that impacts the condition of the one of the indicated trees;
    determining a further probability of the reason posing the hazard based on the impacted condition of the one of the indicated trees; and
    determining whether the further probability is greater than the risk threshold associated with the reason,
    wherein the one of the indicated trees poses the hazard when the further probability is greater than the risk threshold.

14. The computer program product of claim 13, wherein the natural condition is at least one of a weather condition and a wind condition.

15. The computer program product of claim 2, wherein the geographic area is an urban environment.

16. The computer system of claim 3, wherein the images that are received are captured by an imager of a satellite, an imager of a device of a population, or a combination thereof.

17. The computer system of claim 3, wherein the determining the indicated trees comprises:
    selecting a reason associated with posing the hazard;
    determining a probability of the reason posing the hazard; and
    determining whether the probability is greater than a risk threshold associated with the reason,
    wherein one of the indicated trees poses the hazard when the probability is greater than the risk threshold.

18. The computer system of claim 17, wherein the reasons include a regrowth from work performed on the one of the indicated trees, a proximity of the one of the indicated trees to an electrical line, broken or partially attached branches of the one of the indicated trees, an open cavity on the one of the indicated trees, dead or dying branches on the one of the indicated trees, branches of the one of the indicated trees arising from a single point on a trunk, at least one of decay and rot in old wounds of the one of the indicated trees, a recent change in one of grade, soil level, or other construction around the one of the indicated trees, or a combination thereof.

19. The computer system of claim 17, further comprising:
    receiving data indicative of a natural condition that impacts the condition of the one of the indicated trees;
    determining a further probability of the reason posing the hazard based on the impacted condition of the one of the indicated trees; and
    determining whether the further probability is greater than the risk threshold associated with the reason,
    wherein the one of the indicated trees poses the hazard when the further probability is greater than the risk threshold.

20. The computer system of claim 19, wherein the natural condition is at least one of a weather condition and a wind condition.

21. A tree maintenance device for managing tree risk, the tree maintenance device being associated with a team, comprising:
    one or more computer processors, one or more computer-readable storage media, and program instructions stored on the one or more of the computer-readable storage media for execution by at least one of the one or more processors capable of performing a method, the method comprising:

capturing images of a portion of a geographic area that the tree maintenance device is located, the images indicative of conditions of trees located in the portion of the geographic area;

classifying a respective risk associated with each of the trees;

determining indicated trees from the trees, the indicated trees having the respective risk greater than an acceptable threshold;

determining a prioritization for the indicated trees based on the respective risk;

generating a notification identifying the indicated trees and a respective location of the indicated trees; and transmitting the notification to a team equipped to remediate a hazard of the indicated trees, the notification indicating an order in which to remediate the hazard of the indicated trees based on the prioritization.

22. A computer-implemented method for managing tree risk by a team utilizing a tree maintenance device, the method comprising:

capturing images of a portion of a geographic area that the tree maintenance device is located, the images indicative of conditions of trees located in the portion of the geographic area;

classifying a respective risk associated with each of the trees;

determining indicated trees from the trees, the indicated trees having the respective risk greater than an acceptable threshold;

determining a prioritization for the indicated trees based on the respective risk;

generating a notification identifying the indicated trees and a respective location of the indicated trees; and transmitting the notification to a team equipped to remediate a hazard of the indicated trees, the notification indicating an order in which to remediate the hazard of the indicated trees based on the prioritization.

* * * * *